United States Patent
Cornog et al.

(10) Patent No.: US 6,330,369 B1
(45) Date of Patent: Dec. 11, 2001

(54) METHOD AND APPARATUS FOR LIMITING DATA RATE AND IMAGE QUALITY LOSS IN LOSSY COMPRESSION OF SEQUENCES OF DIGITAL IMAGES

(75) Inventors: Katherine H. Cornog, Newburyport; David F. Hoag, Medford, both of MA (US)

(73) Assignee: Avid Technology, Inc., Tewksbury, MA (US)

( * ) Notice: Subject to any disclaimer, the term of this patent is extended or adjusted under 35 U.S.C. 154(b) by 0 days.

(21) Appl. No.: 09/113,954

(22) Filed: Jul. 10, 1998

(51) Int. Cl.[7] ........................................... G06K 9/36
(52) U.S. Cl. .............................. 382/251; 382/239
(58) Field of Search ................................. 382/232, 236, 382/239, 248, 250, 251; 348/405, 404; 358/536, 261.3, 430, 432, 433; 375/240.02, 240.03

(56) References Cited

U.S. PATENT DOCUMENTS

| 5,333,012 | 7/1994 | Singhal et al. | ............... | 348/405 |
| 5,764,806 | * 6/1998 | Horiuchi et al. | ............... | 382/239 |

FOREIGN PATENT DOCUMENTS

| 0 469 648 A2 | 2/1992 | (EP) | ............... | H04N/7/135 |
| 0 478 230 A2 | 4/1992 | (EP) | ............... | H04N/7/133 |
| 0 500 077 A2 | 8/1992 | (EP) | ............... | H04N/7/133 |
| 0 509 576 A2 | 10/1992 | (EP) | ............... | H04N/7/133 |

* cited by examiner

*Primary Examiner*—Phuoc Tran
(74) *Attorney, Agent, or Firm*—Peter J. Gordon (57) ABSTRACT

By limiting the extent to which the degree of quantization is lowered to increase the amount of compressed data, problems of data rate overshoots and image quality degradation in multi layer composites may be avoided. In particular, when a more complex image occurs after a simple image, the quantization used to compress the complex image will not cause as large of a change in the total amount of compressed data. Recovery from such a change also may occur more quickly. Where quantization tables are adjusted using a scaling factor, a limit on the scaling factor may be established such that the target data rate is not achieved for simple images. When rendering multi layer composites, this limit is such that recompression of previously compressed data does not result in additional loss of information. As a result, degradation of image quality in each layer of the composite is avoided. Where quantization tables are adjusted using a scaling factor, a limit on the scaling factor is established such that the same quantization table is used for each layer of the composite.

36 Claims, 7 Drawing Sheets

METHOD AND APPARATUS FOR LIMITING DATA RATE AND IMAGE QUALITY LOSS IN LOSSY COMPRESSION OF SEQUENCES OF DIGITAL IMAGES

BACKGROUND

Sequences of digital images, obtained for example by digitizing motion pictures or television signals, commonly are compressed for storage on a computer readable and writeable medium for subsequent authoring and playback of multimedia programs using editing systems such as the Media Composer editing system from Avid Technology, Inc. A variety of compression techniques have been developed, including several standards. In some systems each image, i.e., a field or frame, in the sequence of digital images is compressed separately using still image compression techniques. An example of such a compression technique is known as "JPEG," which is an acronym for 37 Joint Photographic Experts Group." This group developed the ISO 10918-1 JPEG Draft International Standard, CCITT Recommendation T.81.

The draft standard is described in JPEG Still Image Data Compression Standard by William B.

Pennebaker and Joan L. Mitchell, New York: Van Nostrand Reinhold, 1993, and in "The JPEG Still Picture Compression Standard" by Gregory K. Wallace, Communications of the ACM, April 1991, pages 31–44.

Using JPEG and other forms of still image compression, the image is subdivided into blocks of picture elements (pixels). Each block is transformed from its color representation in the spatial domain to a color representation in a frequency domain, for example using a discrete cosine transform. The resulting matrix of frequency coefficients, one coefficient for each frequency, is quantized using a set of quantizers, one quantizer for each frequency, to provide a quantized value for each frequency. Each frequency coefficient is divided by the corresponding quantizer. The set of quantizers typically is referred to as a quantization table or quantization matrix. The quantized values are entropy-encoded. In the JPEG standard, entropy encoding is performed by run length encoding followed by Huffinan encoding. Arithmetic coding also may be used.

Adaptive quantization methods change the quantizers, either within an image on block boundaries, or from one image to the next. Quantizers may be modified either to change the data rate or to change the visual fidelity with which the image is reproduced. An increase in a quantizer value decreases the data rate but also loweres the fidelity of the quantized result. Quantizers may be adapted individually, or the table of quantizers may be scaled uniformly by a scale factor. The JPEG standard does not provide for adapting quantizers within an image. However when JPEG is applied to a sequence of digital images, the quantizers may be adapted from one image to the next. The total amount of data produced by compressing an image is compared to a target data rate, from which an adjustment to the quantization table is determined. The adjusted quantization table is applied to the next image in the sequence of digital images. Such a technique is described in U.S. Pat. Nos. 5,577,190 (Peters) and 5,355,450 (Garmon et al.).

SUMMARY

In a sequence of digital images a simple image may be followed by a more complex image. When such a sequence is compressed using adaptive quantization, a complex image following a simple image may cause a large change in data rate to occur. This large change occurs because the degree of quantization of the simple image is lowered to increase the data rate to the target data rate, which in turn increases the data rate when a complex image is encountered. The increased data rate can negatively impact performance.

In some applications, many sequences of digital images are combined together, using a technique called compositing. Two sequences are composited at a time to produce what is called a layer of the composite. Each layer and the final multi layer composite typically are compressed and stored. If each layer is compressed using a different quantization table, which is likely to occur when using adaptive quantization, image quality of the composite may degrade significantly.

By limiting the extent to which quantization is changed to increase the amount of compressed data, these problems may be reduced. In particular, when a more complex image occurs after a simple image, the quantization used to compress the complex image will not cause as large of a change in the total amount of compressed data. Recovery from such a change also may occur more quickly. In one embodiment, quantization tables used for an image may be adjusted using a scaling factor, and a limit on the scaling factor may be established.

When rendering multi layer composites, this limit is such that recompression of previously compressed data does not result in additional loss of information. As a result, degradation of image quality in each layer of the composite is avoided. In one embodiment, where quantization tables for an image are adjusted using a scaling factor, a limit on the scaling factor is established such that the same quantization table is used for to compress each layer produced of the composite.

Accordingly, in one aspect a method or apparatus for compressing a sequence of digital images performs compression on an image in the sequence of digital images according to a compression parameter to provide an amount of compressed data. When the amount of compressed data is greater than a target data rate, the compression parameter is adjusted such that a smaller amount of compressed data is obtained. When the amount of compressed data is less than the target data rate, the compression parameter is adjusted such that a larger amount of data is obtained. The adjustment to the compression parameter is limited according to a limit factor. In one embodiment, the compression parameter includes a quantization table and a scale factor. Performing compression includes transforming blocks of the image into matrices of values in a frequency domain and quantizing the matrices of values using a quantization table scaled by a scale factor. Adjusting the compression parameter thus involves changing the scale factor subject to the limit factor. In one embodiment, performing compression involves compressing an image in the sequence of digital images, and, after adjusting the compression parameter, a next image in the sequence of digital images is compressed using the adjusted compression parameter. In another embodiment, performing compression involves compressing a block of an image in the sequence of digital images and, after adjusting the compression parameter, a next block in the image is compressed using the adjusted compression parameter.

In another aspect, an apparatus for compressing a sequence of digital images includes and encoder and a controller. The encoder has a first input for receiving uncompressed image data, a second input for receiving a signal indicating a compression parameter for compressing the uncompressed image data, and an output for providing an amount of compressed data according to the compression parameter. The controller has a first input for receiving a signal indicating the amount of compressed data, a second input for receiving a signal indicating a target amount of data and a third input for receiving a limit factor, and an output providing a compression parameter to the encoder according to the difference between the target amount of data and the amount of compressed data and the limit factor. In one embodiment, the encoder compresses the image using a quantization table scaled by a scale factor. In this embodiment, the controller further comprises a circuit having a first input for receiving a signal indicating the amount of compressed data and a signal indicating the target amount of compressed data and an output for providing an updated scale factor. A comparator has a first input for receiving the limit factor and a second input for receiving the updated scale factor, and an output for providing a signal indicating a selected scale factor according to a comparison of the updated scale factor to the limit factor.

In another aspect, a method and apparatus for performing multi layer compositing of sequences of digital images involves generating a first composite sequence of digital images from a background sequence of digital images and a first foreground sequence of digital images. The first composite sequence of digital images is compressed using adaptive compression to define a first set of compression parameters, wherein the first set of compression parameters are limited using a limit factor. A second composite sequence of digital images is generated from the first composite sequence of digital images and a second foreground sequence of digital images. The second composite sequence of digital images is compressed using adaptive compression to define a second set of compression parameters, wherein the second set of compression parameters are limited using the limit factor. The limit factor is such that the second set of compression parameters is equal to the first set of compression parameters for a substantial number of images in each composite sequence.

In another aspect, a digital information product includes a compressed sequence of digital images stored on a computer-readable medium, wherein the compressed sequence is created using a limit factor. In another aspect, a method for decompression of a compressed sequence of digital images includes receiving a compressed sequence created using a limit factor.

In another aspect, a video signal compression apparatus includes a source of video signal to be compressed. A first compression circuit partially compresses the video signal. A second compression circuit completes compression of the partially compressed video signal. A quantizer is coupled between said first and second compression circuits for quantizing the partially compressed video signal. The quantizer has an input for receiving quantizing scale factors. An apparatus generates quantizing scale factors in accordance with the rate of compressed data provided by the second compression circuit. A circuit is responsive to the quantizing scale factors for limiting the values of respective quantizing scale factors applied to the quantizer to a predetermined range of values less than the range of quantizing scale factor values provided by the apparatus for generating quantizing scale factors. In one embodiment, the quantizer includes a source of a matrix of quantizing values, a scaler for scaling the matrix of quantizing values by the quantizing scale factor, and a circuit for dividing respective values of the partially compressed video signal by respective quantizing values scaled by the quantizing scale factor. In another embodiment, the apparatus for generating quantizing scale factors and the circuit for limiting the minimum value quantizing scale factor are part of the same circuitry. In another embodiment, the apparatus for limiting the minimum value quantizing scale factor is programmable.

DETAILED DESCRIPTION

The following detailed description should be read in conjunction with the attached drawing in which similar reference numbers indicate similar structures. All references cited herein are hereby expressly incorporated by reference.

Figure 1:
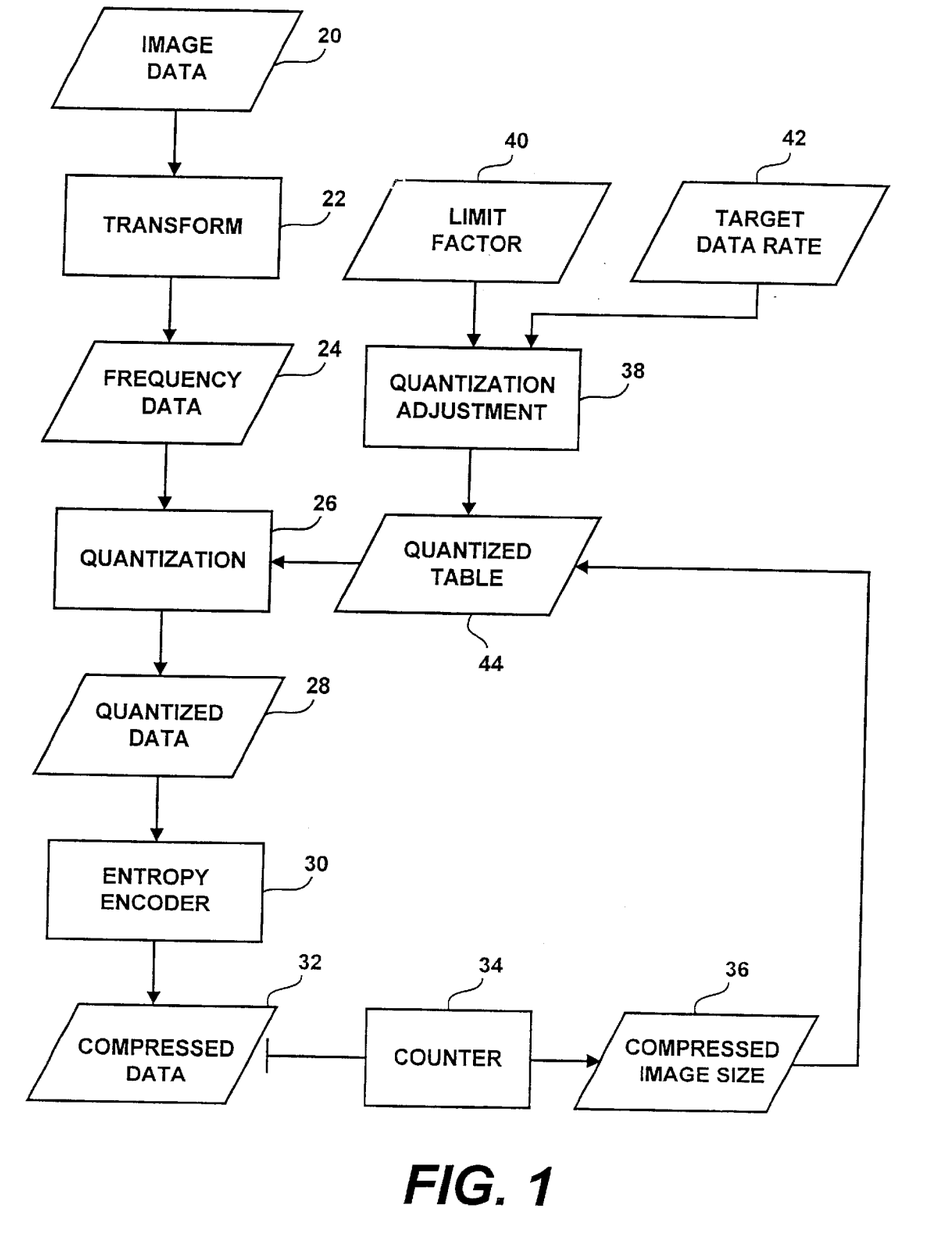
FIG. 1 is a data flow diagram of a compression circuit using a limit factor on quantization adjustment.

FIG. 1 is a data flow diagram of a compression circuit using a limit factor on quantization adjustment. The compression circuit receives image data 20 which, in a first compression step, is transformed using a transform circuit 22 into frequency domain data 24. The frequency domain data is quantized by a quantization circuit 26 to produce quantized data 28. Quantization is used in forms of lossy compression; other forms of lossy compression also may be used in combination with a limit factor as described herein. The quantized data 28 is entropy encoded using an entropy encoder 30, in a second compression step, to produce compressed data 32. Other forms of lossless compression also may be used by encoder 30. A measure of the size of the compressed image is determined, for example by measuring an amount of memory occupied by the compressed data or by using a counter of bytes of compressed data output by the compression circuit, such as shown at 34. This measure is provided to a quantization adjustment module 38. Using a limit factor 40 and a target data rate 42, the quantization adjustment module 38 produces a new quantization table 44. This quantization table 44 is used by the quantization circuit 26 to compress the next image, or the next image block.

Figure 2:
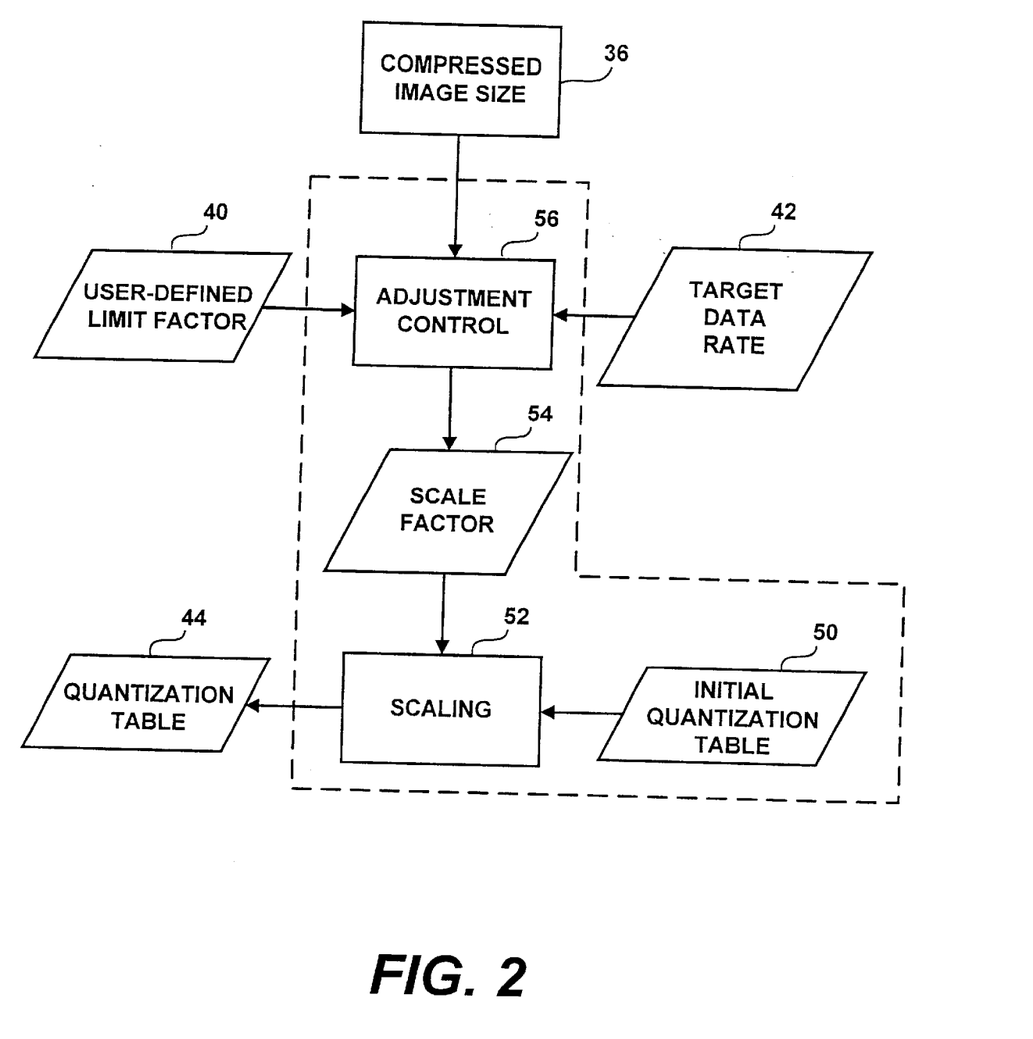
FIG. 2 illustrates a more detailed data flow diagram of the quantization adjustment of FIG. 1.

The quantization adjustment module 38 will now be described in more detail in connection with FIG. 2. The quantization adjustment module may be implemented in many ways and is not limited to the circuit shown in FIG. 2. In FIG. 2, quantization adjustment is provided by using an initial quantization table 50 which is scaled by a scaling module 52 using a scale factor 54. An adjustment control module 56 receives a target data rate 42, a limit factor 40 and the compressed image size 36 to produce the scale factor 54. The initial quantization table, limit factor and target date rate may be user-defined. In one embodiment, a new scale factor is computed and is limited by the limit factor to provide the scale factor 54. As a result the range of values of the scale factor is limited. The scaling module 52 multiplies the values in the initial quantization table 50 by the scale factor 54 to produce quantization table 44. The quantization table 44 is then used to quantize the frequency data 24 (FIG. 1), for example, using the following formula:

round[$S_{v,u}/(Q_{v,u} * sf)$]

where the $S_{v,u}$ is the value at position v,u in the matrix of frequency data 24, $Q_{v,u}$ is the quantizer at position v,u in the initial quantization matrix 50 and sf is the scale factor 54. Rounding of a floating point value produced by the quotient in this formula may be performed, for example, by adding 0.5 to a positive quotient and then truncating the sum, or by adding −0.5 to a negative quotient and then truncating the sum.

Figure 3:
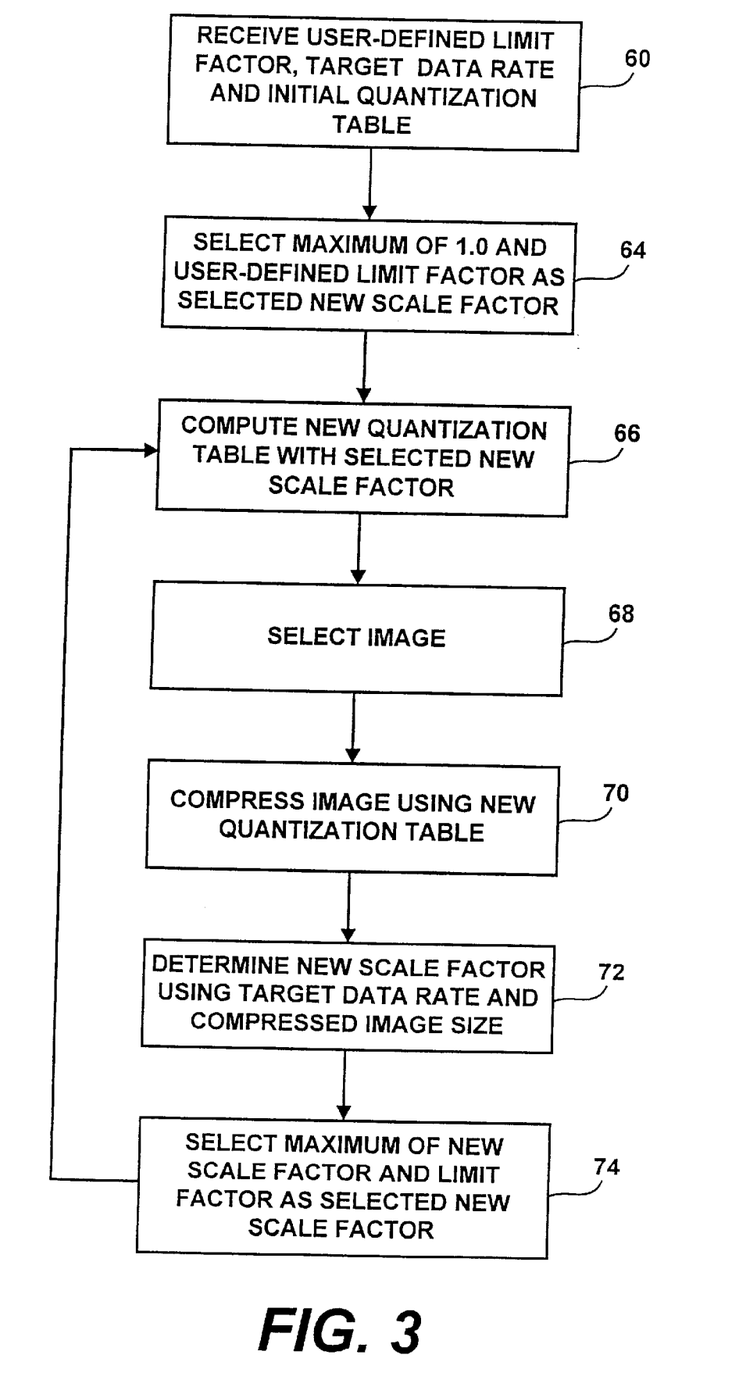
FIG. 3 is a flow chart describing the initialization of the quantization adjustment and compression of a sequence of digital images.

Referring now to FIG. 3, the initialization of the quantization adjustment and compression of a sequence of digital images will now be described. In this flowchart, the order of the steps is merely illustrative and is not indicative of any required order of operation. A limit factor, target data rate and initial quantization table are received in step 60. Any suitable user interface may be used to receive these values when they are user-defined. These values also may be stored in a file or may be defmed by compression parameters within a system.

Suitable values for the limit factor, target data rate and initial quantization table may be determined empirically. For example, a sequence of average complexity images may be compressed to a target data rate using the adaptive methods described, for example, in U.S. Pat. No. 5,577,190. The initial quantization table for the target data rate may be defined using a quantization table that compressed an average complexity image to the target data rate. A scale factor to be applied to this initial quantization table to provide the target data rate would be 1.0. A limit factor would thus be selected to be less than 1.0. Example limit factors and corresponding target data rates for compression of a sequence of digital images corresponding to a spatial resolution of an NTSC (PAL) television signal are:

For 300 (360) Kilobytes per frame, two fields per frame: 0.5

For 200 (240) Kilobytes per frame, two fields per frame: 0.4

For 350 (42) Kilobytes per frame, two fields per frame: 0.1

Example limit factors and corresponding target data rates for compression of a sequence of digital images corresponding to a half-width resolution NTSC (PAL) television signal are:

For 100 (120) Kilobytes per frame, one field per frame: 0.4

For 50 (60) Kilobytes per frame, one field per frame: 0.4

For 12 (14) Kilobytes per frame, one field per frame: 0.1

Referring again to FIG. 3, when initializing the compression process, the limit factor is compared to a constant value which is representative of a scale factor that causes average complexity images to be compressed at the target data rate. For example this constant value is 1.0 using the method described above to compute the initial quantization table. The maximum of the limit factor and this constant is selected as a "selected new scale factor" in step 64. The selected new scale factor is used to scale the initial quantization table in step 66 to obtain a new quantization table. An image in the sequence of digital images is selected in step 68. The selected image is compressed in step 70 using the new quantization table. A new scale factor is determined using the target data rate and the compressed image size in step 72. The system selects the maximum of the new scale factor and the user-defined limit factor as the selected new scale factor in step 74 which is used in step 66 to adjust the quantization tables for the next image.

One particular embodiment will now be described in connection with FIG. 4. In this embodiment, a compression circuit 80 is used to compress image data. The compression circuit is implemented as a integrated circuit. An example compression circuit is the ZR36050 JPEG Image Compression Processor from Zoran Corporation of Santa Clara, California, for which a data sheet published July 1996 is hereby incorporated by reference. The compression circuit has a data input 82 for receiving image data and a compressed data output 84. An address input 86 receives an address for accessing internal memory. The internal memory includes a register 88 in which a new scale factor is stored by the circuit after each image is processed. The new scale factor is computed by the circuit according to a constant bit rate algorithm using the compressed image size which is performed internally in the ZR36050 JPEG processor.

Other JPEG processors and chip sets may be used. For example, C-Cube Microsystems provides a CL550B and CL560 processors. LSI Logic provides a chip set including the L64735 DCT processor, the L64745 JPEG coder and the L64765 Color and Raster Block Converter. Another manufacturer of such circuits is Oak Technology of Andover, Massachusetts. These chips do not have an internal mechanism for computing a new scale factor for each image, so other mechanisms may be provided to compute a new scale factor. Such a mechanism may be implemented in a circuit to be used in conjunction with the compression circuit or may be implemented in a computer program executed on a general purpose computer system. One such mechanism is described in U.S. Pat. No. 5,577,190 (Peters). Another example constant bit rate algorithm is represented by the following formula to obtain a new scale factor:

log(NewSF) =rc alpha*[log(BytesThisFrame)−log (TargetBytes)] +log(OldSF)

where NewSF is the new scale factor, rc_alpha is a constant, e.g., 1.2, representing a slope of a log/log graph of the compressed data size with respect to the scale factor, BytesThisFrame is the compressed image size, TargetBytes is the target data rate, and OldSF is the value of the scale factor that was used to compress the current frame to obtain the BytesThisFrame value. The rc alpha constant typically ranges from 1.0 to 2.0, depending on the source material being processed. In non-real time embodiments, the rc_alpha constant may be calculated. In real time compression of sequences of digital images, a value typically is selected. The selected value should be in typical actual range, e.g., between 1.0 and 2.0 or more particularly 1.2 to 1.8.

Figure 4:
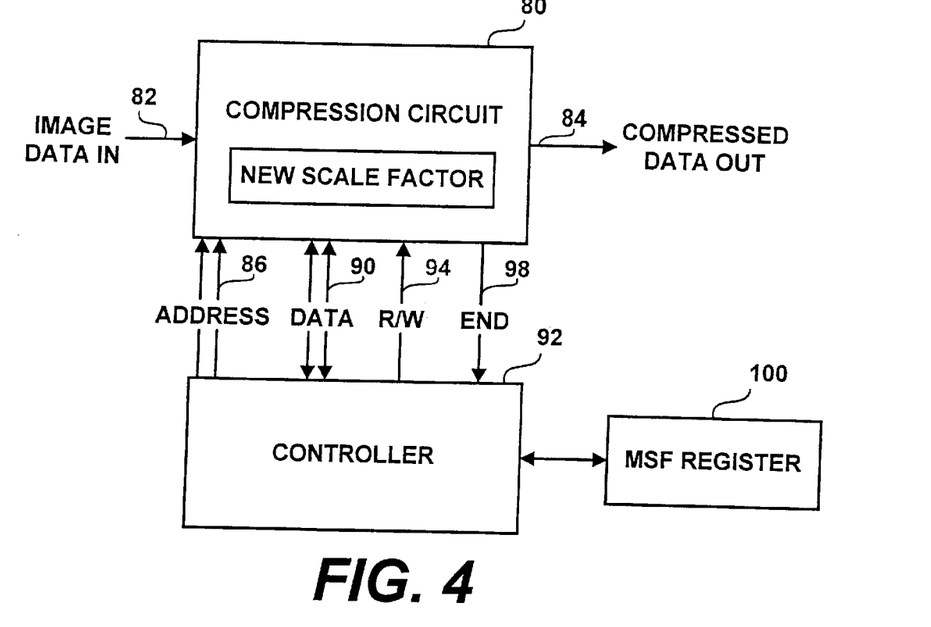
FIG. 4 is a block diagram of a compression circuit used to compress image data using a limit factor.

Using the ZR36050 processor as shown in FIG. 4, the register 88 for the new scale factor may be read from or written to via a data input and output (I/O) 90 which is addressable through address input 86. The internal memory of the ZR36050 processor also includes memory locations accessible through the address input 86 and data I/O 90 for reading and writing an initial quantization table and a target data rate. A controller 92 has an output 94 for the circuit and controlling whether the data I/O 90 permits read or write access. The controller 92 connects to the address input 86 to the compression circuit 80. The controller also connects to the data I/O 90. The compression circuit also has an output 98 which signifies that an end of an image has been processed, which is connected to an input of the controller 92. The controller also has access to a register 100 to store the limit factor. The controller and its use in connection with other circuitry to provide a peripheral board for a computer is described in more detail in U.S. patent application Ser. No. 09/054,764, filed April 3, 1998. For the purpose of describing this embodiment, the operation of the controller 92 is described in more detail in FIG. 5.

Figure 5:
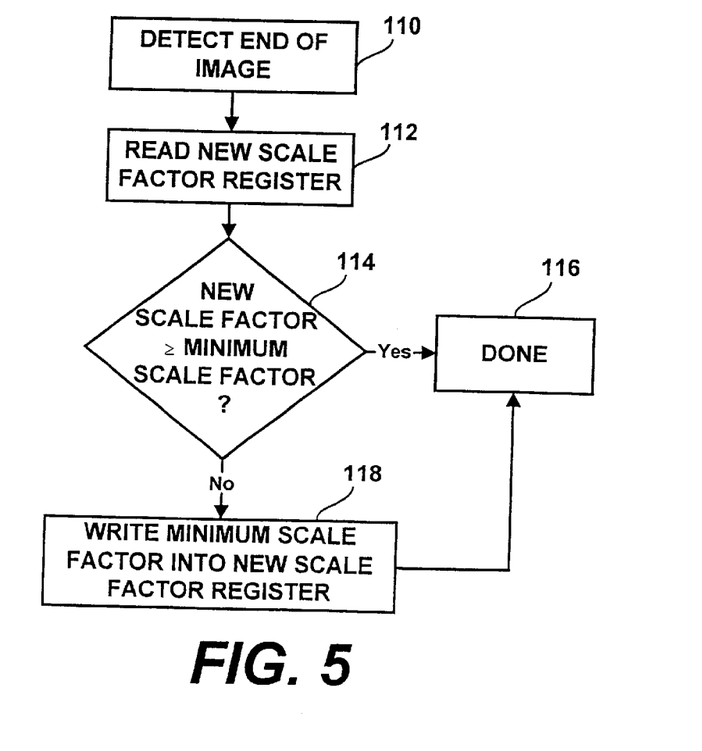
Fig. 5 is a flow chart describing how a controller operates to implement a limit factor on the adjustment of the quantization tables in the compression circuit of FIG. 4.

FIG. 5 is a flow chart describing how the controller 92 operates to implement a limit factor on the adjustment of the quantization tables in the compression circuit 80. First, the controller 92 detects the end of an image via the end signal 98 from the compression circuit 80 in step 110. The new scale factor register 88 is read in step 112. A comparison is performed in step 114 between the new scale factor and the minimum scale factor from the minimum scale factor (MSF) register 100. If the new scale factor is greater than or equal to the minimum scale factor, no changes are made to the new scale factor in register 88 in compression circuit 80 and the process is complete as indicate at step 116. Otherwise, the minimum scale factor is written to the new scale factor register 88 in the compression circuit 80 in step 118.

Figure 6A:
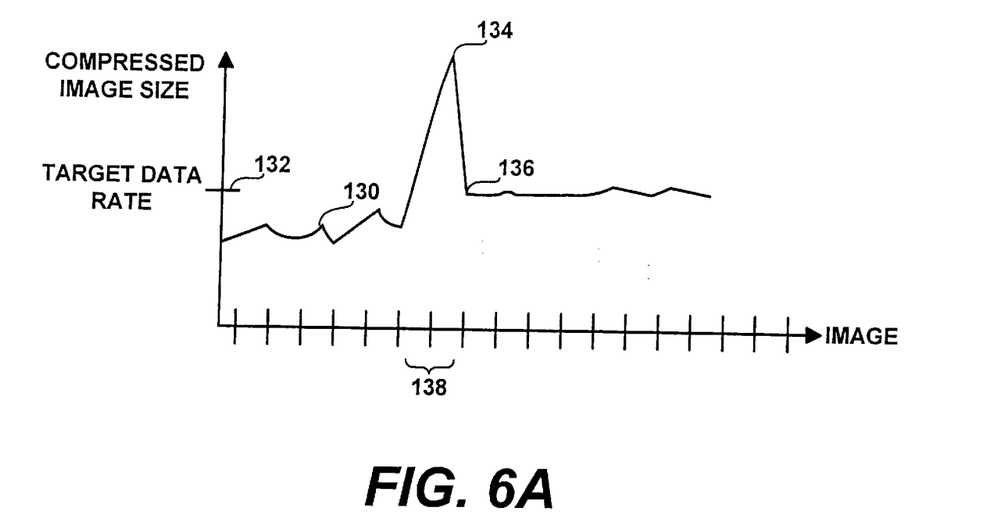
FIG. 6A is an illustrative graph of compressed image size with respect to images in a sequence of images compressed using a limit factor.
Figure 6B:
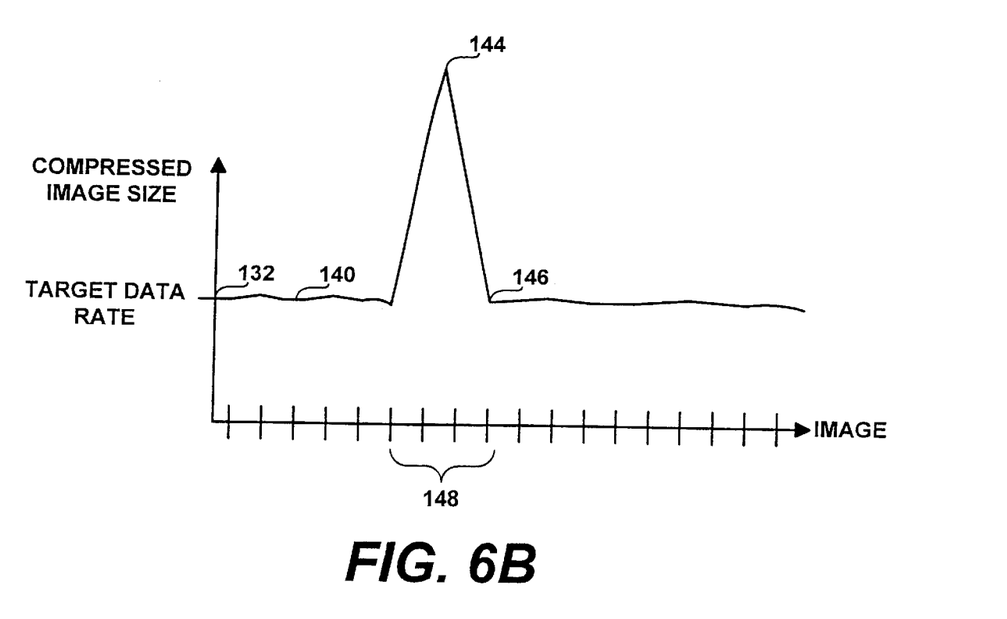
FIG. 6B is an illustrative graph of compressed image size with respect to images in a sequence of images compressed without using a limit factor.

FIG. 6A and 6B are illustrative graphs of compressed image size with respect to each image in a sequence of images in which several simple images, e.g., the first six images, are followed by more complex images. FIG. 6A illustrates a typical result using a limit factor. In this graph, the compressed image size of the first six simple images, indicated at 130, is lower than the target data rate 132. When a complex image occurs in the sequence, the compressed data size increases as indicated at 134. For the next image in the sequence, the compressed image size returns to about the target data rate, as indicated at 136. The recovery time, shown at 138, from the large increase in compressed image size is about one image. In contrast, without using a limit factor compression of the same sequence of images typically would produce a graph that appears like that shown in FIG. 6B. In this graph, the compressed image size of the first six simple images, indicated at 140, is about the target data rate 132. When a complex image occurs in the sequence, the compressed data size increases as indicated at 144. This increase is significantly greater than the increase that occurs when a limit factor is used. Over the next few images in the sequence, the compressed image size gradually returns to about the target data rate, as indicated at 146. The recovery time, shown at 148, from the large increase in compressed image size is about three or four images.

The data stream produced by compressing a sequence of digital images using a limit factor in general has, for consecutive simple images, the same quantization table and a data rate lower than the target data rate. The compression thus tends to appear to be variable bit rate compression. However, for more complex images, the data rate tends to be substantially constant and the quantization table tends to be different for each image. The compressed data may be stored in a computer file, for example by using the JPEG file interchange format (JFIF) or in an OpenDML AVI file format. By following these formats, the quantization tables are stored in headers for each compressed image.

Figure 7:
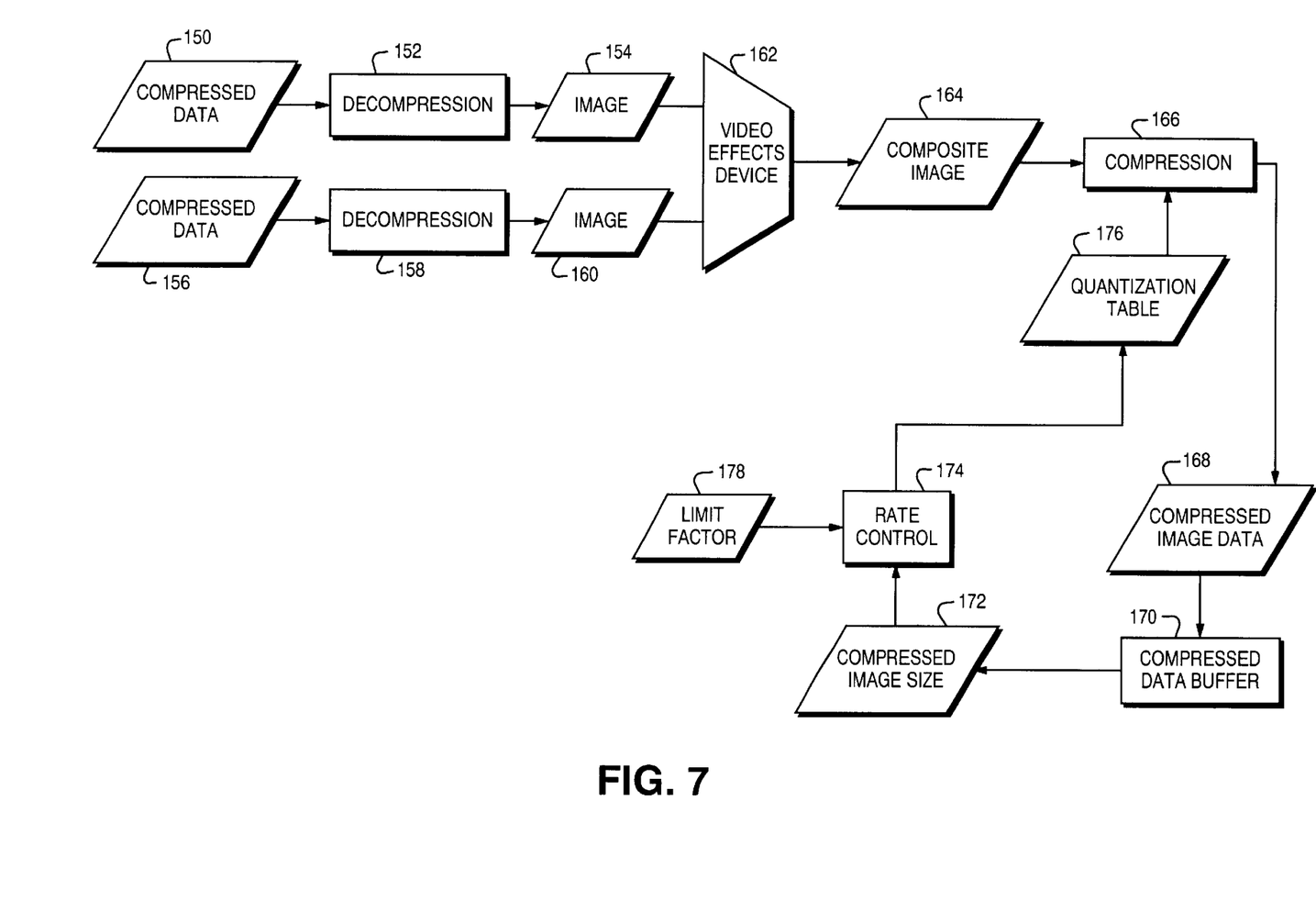
FIG. 7 is a data flow diagram of a compositing system in which compression of a composite sequence of images uses a limit factor.

FIG. 7 illustrates an embodiment where compression is used in the context of multi layer compositing. In this embodiment, there are two sequences of digital images. A first sequence is produced from compressed data 150 which, using decompression circuit 152, is transformed to provide a first sequence of digital images 154. Similarly, compressed data 156 is decompressed using decompression circuit 158 to produce a second sequence of digital images 160. The sequences of digital images 154 and 160 are composited using a video effects device 162 to produce a composite image 164. This composite image is then compressed using compression circuit 166. The compressed image data 168 output from the compression circuit 166 is stored in a compressed data buffer 170. The compressed image size 172 is provided to a rate control mechanism 174 which in turn computes quantization tables 176 to be used by the compression circuit 166 according to a limit factor 178. The combination of compression circuits 166, compressed data buffer 170 and rate control 174 is essentially similar to that shown in FIG. 1.

The initialization process of the quantization adjustment for the circuit of FIG. 7 is that same as shown in FIG. 3. However, the limit factors are different when rendering multilayered composites than when compressing a single sequence of digital images. These limit factors are designed such that images in a sequence, with rare exceptions for extremely complex images, likely will not cause the scale factor to change. As a result, each image in the sequence likely will be compressed using the same quantization table. Example limit factors and corresponding target data rates for multi layer compositing of sequences of digital images corresponding to a spatial resolution of an NTSC (PAL) television signal are:

For 300 (360) Kilobytes per frame, two fields per frame: 1.5

For 200 (240) Kilobytes per frame, two fields per frame: 1.5

For 35 (42) Kilobytes per frame, two fields per frame: 1.2
Example limit factors and corresponding target data rates for multi layer compositing of sequences of digital images corresponding to a half-width resolution NTSC (PAL) television signal are:

For 100 (120) Kilobytes per frame, one field per frame: 1.5

For 50 (60) Kilobytes per frame, one field per frame: 1.5

For 12 (14) Kilobytes per frame, one field per frame: 1.2
Because the initialization process selects a scale factor for the first image that is the maximum of a constant, e.g., 1.0, and the limit factor, which tends to be greater than 1.0, the scale factor for the first image is greater than 1.0.

Figure 8:
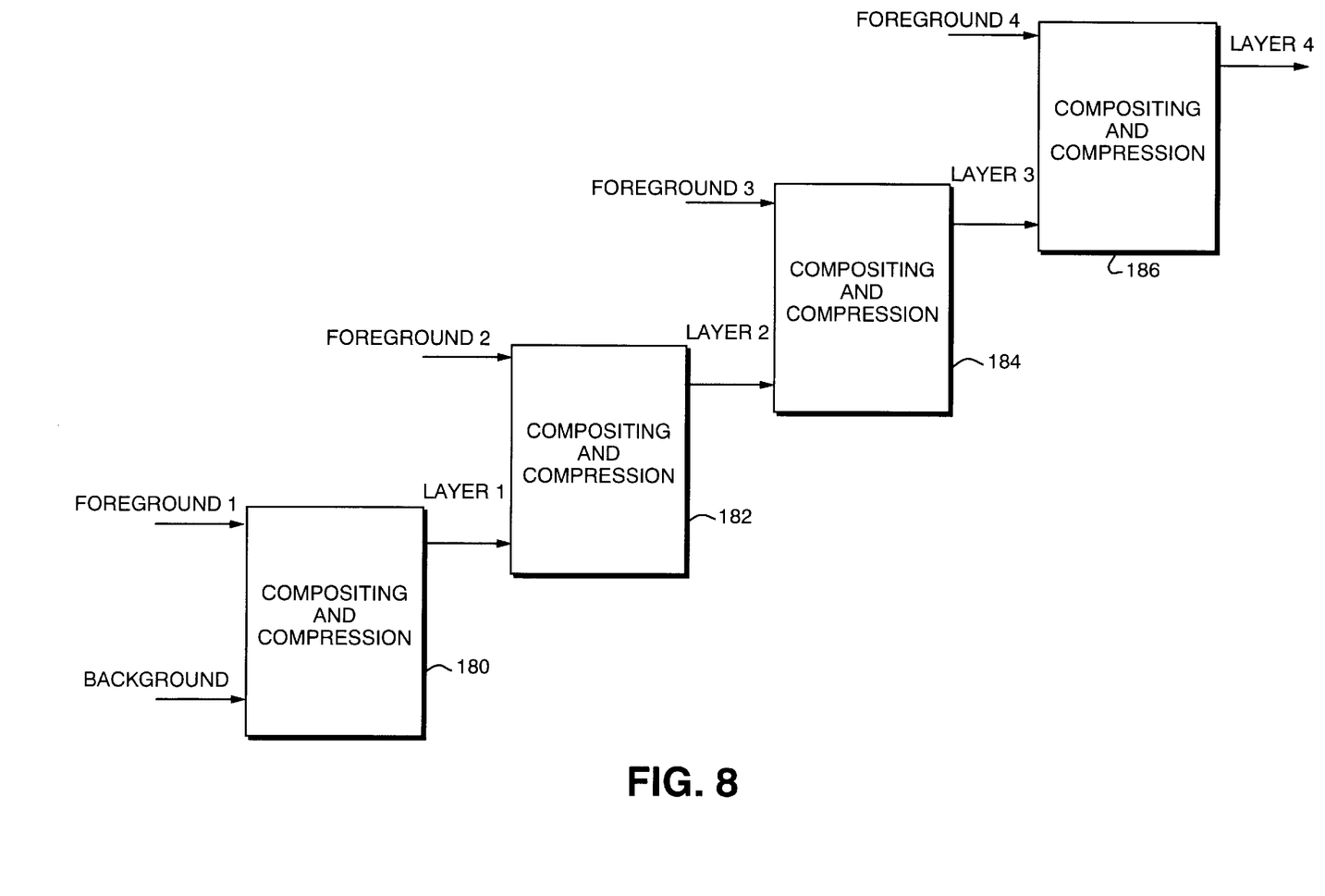
FIG. 8 is a data flow diagram representing a circuit for producing a multi layer composite.

FIG. 8 illustrates a block diagram of multiple compositing layers. Each compositing and compression module 180, 182, 184 and 186 may be implemented using the circuit defined by the data flow diagram of FIG. 7. In this diagram, the first compositing and compression module 180 receives a foreground and background image to produce layer 1. Layer 1 and foreground 2 are composited by module 182 to produce layer 2. Foreground 3 and layer 2 are combined to produce layer 3, and so on. The final layer, in this diagram layer 4, does not experience as much image quality degradation when the quantization tables used by the compositing and compression modules 180, 182, 184 and 186 are the same as if they were allowed to adapt continuously. Regions of the background image (or of the previous layer) which remain unchanged as a result of the composite suffer no further degradation. Only regions in which the pixel values are changed by the composite result in a quantization loss.

Other embodiments of the systems such as shown in FIGS. 1 through 8 include computer programs designed to perform the same functions when executed on a general purpose computer. Such a computer system or computer-implemented process may be used, for example, for performance or simulation of rendering of multi layer composites or compression of data files.

Having now described a few embodiments, it should be apparent to those skilled in the art that the foregoing is merely illustrative and not limiting, having been presented by way of example only. Numerous modifications and other embodiments are within the scope of one of ordinary skill in the art. For example, multiple quantization tables may be used instead of a scale factor, from which a quantization table may be selected based on the compressed image size and target data rate. Limit factors in this and other embodiments may be limits on the values of each quantizer in the quantization table. The constraint on the adjustment of the quantization table also may be used in systems in which the quantization table is adjusted for each block within the image, including other compression methods, such as MPEG. In MPEG the scale factor is called "imquant" which may be changed for every macroblock that is processed. Other lossy techniques may be constrained in the process of generating multi layer composites so that each layer of the composite is prevented from further image quality degradation due to compression. These and other modifications and embodiments are contemplated as falling within the scope of the invention.

What is claimed is:

1. A computer-implemented process for compressing a sequence of digital images, comprising:

performing compression on at least part of a first image in the sequence of digital images according to a quantization table and a scale factor to provide an amount of compressed data;

if the amount of compressed data is greater than a target data rate, adjusting the scale factor such that a smaller amount of compressed data will be obtained by performing compression according to the adjusted scale factor and the quantization table than if the scale factor is not adjusted;

if the amount of compressed data is less than the target data rate, adjusting the scale factor such that a larger amount of data will be obtained by performing compression according to the adjusted scale factor and the quantization table than if the scale factor is not adjusted; [and] comparing a magnitude of the scale factor to the magnitude of a limit factor; and limiting the magnitude of the scale factor according to the comparison.

2. The computer-implemented process of claim 1, wherein the step of performing compression includes the steps of:

transforming blocks of the first image into matrices of values in a frequency domain; and quantizing the matrices of values using the quantization table scaled by the scale factor[; and wherein the steps of adjusting include changing the scale factor subject to the limit factor].

3. The computer-implemented process of claim 2, wherein the step of performing compression compresses the first image, and the process further comprises the step of, after adjusting the scale factor and limiting the magnitude of the scale factor, compressing a next image in the sequence of digital images using the adjusted scale factor having the limited magnitude and the quantization table.

4. The computer-implemented process of claim 3, wherein the step of performing compression compresses the first image only once.

5. The computer-implemented process of claim 2, wherein the step of performing compression compresses a first block of the first image in the sequence of digital images, and the process further comprises the step of, after adjusting the scale factor and limiting the magnitude of the scale factor, compressing a next block in the first image using the adjusted scale factor having the limited magnitude and the quantization table.

6. The computer-implemented process of claim 5, wherein the step of performing compression compresses the first block only once.

7. The computer-implemented process of claim 1, wherein the step of performing compression compresses the first image in the sequence of digital images, and the step of performing compression compresses the first image only once.

8. The computer-implemented process of claim 7, wherein both the step of adjusting the scale factor and the step of limiting the magnitude of the scale factor are performed only once on the first image.

9. The computer-implemented process of claim 1, wherein the step of performing compression compresses the first image in the sequence of digital images, and both the step of adjusting the scale factor and the step of limiting the magnitude of the scale factor are performed only once for the first image.

10. The computer-implemented process of claim 1, wherein the step of performing compression compresses a block of the first image in the sequence of digital images, and the step of performing compression compresses the block only once.

11. The computer-implemented process of claim 10, wherein both the step of adjusting the scale factor and the step of limiting the magnitude of the scale factor are performed only once on the block.

12. The computer-implemented process of claim 1, wherein the step of performing compression compresses a block of the image in the sequence of digital images, and both the step of adjusting the scale factor and the step of limiting the magnitude of the scale factor are performed only once for the block.

13. An apparatus for compressing a sequence of digital images, comprising:

an encoder having a first input for receiving uncompressed image data defining at least part of a first image of the sequence of digital images, a second input for receiving a signal indicating a quantization table, a third input for receiving a signal indicating a scale factor, both the quantization table and the scale factor for compressing the uncompressed image data, and an output for providing an amount of compressed data according to the quantization table and the scale factor; and a controller comprising:

a circuit having a first input for receiving a signal indicating the amount of compressed data, a second input for receiving a signal indicating a target amount of compressed data and an output for providing an updated scale factor updated according to the difference between the target amount of data and the amount of compressed data; and a comparator having a first input for receiving a limit factor, a second input for receiving the updated scale factor, and an output for providing a signal indicating an adjusted scale factor to the encoder, the adjusted scale factor selected according to a comparison of a magnitude of the updated scale factor to a magnitude of the limit factor such that the adjusted scale factor has a magnitude limited by the limit factor.

14. The apparatus of claim 13, wherein the encoder compresses the at least part of the first image using the quantization table scaled by the scale factor.

15. The apparatus of claim 13, wherein the uncompressed image data defines the first image, and the encoder is operative to compress the first image using the quantization table and the scale factor, and wherein the encoder is operative to compress the first image only once.

16. The apparatus of claim 15, wherein the controller is operative to adjust the scale factor only once for the first image and to limit the magnitude of the scale factor according to the limit factor only once for the first image.

17. The apparatus of claim 13, wherein the uncompressed image data defines the first image, and the encoder is operative to compress the first image using the quantization table and the scale factor, and wherein the controller is operative to adjust the scale factor only once for the first image and to limit the magnitude of the scale factor according to the limit factor only once for the first image.

18. The apparatus of claim 13, wherein the uncompressed image data defines a block of the first image, and the encoder is operative to compress the block using the quantization table and the scale factor, and wherein the encoder is operative to compress the block only once.

19. The apparatus of claim 18, wherein the controller is operative to adjust the scale factor only once for the block and to limit the scale factor according to the limit factor only once for the block.

20. The apparatus of claim 13, wherein the uncompressed image data defines a block of the first image, and the encoder is operative to compress the block using the quantization table and the scale factor, and wherein the controller is operative to adjust the scale factor only once for the block and to limit the magnitude of the scale factor according to the limit factor only once for the block.

21. The apparatus of claim 13, wherein the uncompressed image data defines the first image, the encoder is operative to compress the first image, and the third input is operative to receive the signal indicating the adjusted scale factor, and wherein the encoder is further operative to compress a next image in the sequence of digital images using the adjusted scale factor and the quantization table.

22. The apparatus of claim 21, wherein the encoder is operative to compress the first image only once.

23. The apparatus of claim 13, wherein the uncompressed image data defines a first block of the first image, the encoder is operative to compress the first block, and the third input is operative to receive the signal indicating the adjusted scale factor, and wherein the encoder is further operative to compress a next block of the image using the adjusted scale factor and the quantization table.

24. The apparatus of claim 23, wherein the encoder is operative to compress the first block only once.

25. A system for compressing a sequence of digital images, comprising:
    means for performing compression on at least part of a first image in the sequence of digital images according to a quantization table and a scale factor to provide an amount of compressed data;
    means for adjusting, if the amount of compressed data is greater than a target data rate, the scale factor such that a smaller amount of compressed data will be obtained by performing compression according to the adjusted scale factor and the quantization table than if the scale factor is not adjusted;
    means for adjusting, if the amount of compressed data is less than the target data rate, the scale factor such that a larger amount of data will be obtained by performing compression according to the adjusted scale factor and the quantization table than if the scale factor is not adjusted;
    means for comparing a magnitude of the scale factor to a magnitude of a limit factor; and
    means for limiting a magnitude of the scale factor according to the comparison.

26. The system of claim 25, wherein the means for performing compression includes:
    means for transforming blocks of the first image into matrices of values in a frequency domain; and
    means for quantizing the matrices of values using the quantization table scaled by the scale factor.

27. The system of claim 26, wherein the means for performing compression comprises means for compressing the first image, and
    wherein the system further comprises means for compressing, after adjusting the scale factor and limiting the magnitude of the scale factor, a next image in the sequence of digital images using the adjusted scale factor having the limited magnitude and the quantization table.

28. The system of claim 27, wherein the means for performing compression comprises means for compressing the first image only once.

29. The system of claim 26, wherein the means for performing compression comprises means for compressing a first block of the first image in the sequence of digital images, and the system further comprises means for compressing, after adjusting the scale factor and limiting the magnitude of the scale factor, a next block in the first image using the adjusted scale factor having the limited magnitude and the quantization table.

30. The system of claim 29, wherein the means for performing compression compresses the first block only once.

31. The system of claim 25, wherein the means for performing compression comprises means for compressing the first image in the sequence of digital images, and the means for performing compression comprises means for compressing the first image only once.

32. The system of claim 31, wherein the means for adjusting the scale factor comprises means for adjusting the scale factor only once on the first image, and wherein the means for limiting the scale factor comprises means for limiting the scale factor only once on the first image.

33. The system of claim 25, wherein:
    the means for performing compression comprises means for compressing the first image in the sequence of digital images;
    the means for adjusting the scale factor comprises means for adjusting the scale factor only once for the first image; and
    the means for limiting the scale factor comprises means for limiting the scale factor only once for the first image.

34. The system of claim 25, wherein the means for performing compression comprises means for compressing a block of the first image in the sequence of digital images; and
    wherein the means for performing compression comprises means for compressing the block only once.

35. The system of claim 34, wherein the means for adjusting the scale factor comprises means for adjusting the scale factor only once on the block, and wherein the means for limiting the scale factor comprises means for limiting the scale factor only once on the block.

36. The system of claim 25, wherein:

the means for performing compression comprises means for compressing a block of the image in a sequence of digital images;

the means for adjusting the scale factor comprises means for adjusting the scale factor only once for the block; and the means for limiting the scale factor comprises means for limiting the scale factor only once for the block.

* * * * *